United States Patent [19]

Rice

[11] 4,256,769

[45] Mar. 17, 1981

[54] EXTRUDED WHEAT GERM FOOD PRODUCT AND METHOD OF PREPARATION

[75] Inventor: Wayne K. Rice, Wanatah, Ind.

[73] Assignee: Vitamins, Inc., Chicago, Ill.

[21] Appl. No.: 17,461

[22] Filed: Mar. 5, 1979

[51] Int. Cl.³ .............................................. A23B 1/04
[52] U.S. Cl. ..................................... 426/72; 426/448;
426/450; 426/465; 426/625
[58] Field of Search ................. 426/72, 448, 449, 450,
426/625, 465, 466

[56] References Cited

U.S. PATENT DOCUMENTS

| | | | |
|---|---|---|---|
| 2,085,421 | 6/1937 | Donk et al. | 426/450 X |
| 2,282,788 | 5/1942 | Musher | 426/72 |
| 3,097,947 | 7/1963 | Kemmerer | 426/72 X |
| 3,895,121 | 7/1975 | Huessy | 426/448 X |

FOREIGN PATENT DOCUMENTS 218614  5/1957  United Kingdom ..................... 426/449

*Primary Examiner*—Arthur D. Kellogg
*Attorney, Agent, or Firm*—Cook, Wetzel & Egan, Ltd.

[57] ABSTRACT

An extruded defatted wheat germ food product has an expanded open-cell structure with a crisp, crunchy palatable nut-like flavor is stable in the presence of air at room temperatures. The product is produced by defatting wheat germ, increasing the moisture to 12–25% by weight, and extruding the moist wheat germ into atmospheric pressure, where the wheat germ is permitted to expand. The extruded product is dried to a moisture level below about 8%.

22 Claims, No Drawings

EXTRUDED WHEAT GERM FOOD PRODUCT AND METHOD OF PREPARATION

The present invention relates to a new food product comprising defatted, extruded wheat germ which has a crunchy and crisp texture and a palatable, light, and mildly nut-like flavor, which product is stable and has good shelf life in the presence of air at room temperature.

The prior art has recognized wheat germ as a good source of many naturally occurring minerals and vitamins and as a substantial source of protein of high biological value. Wheat germ which is a component of the wheat kernel, as has been recognized by the prior art, is unstable at normal ambient conditions and deteriorates very rapidly into rancid and unpalatable products which are generally unfit for human consumption. Although refrigeration retards, it does not overcome this deterioration. The prior art has proposed a wide variety of methods of treating wheat germ in order to overcome the rancidity problem, including U.S. Pat. Nos. 2,085,421; 2,357,312; 3,036,919; 3,783,164; and 3,895,121.

The present invention is based on the discovery that wheat germ which has been defatted may be extruded under certain conditions to produce a wheat germ product which is stable and storable under ambient conditions and which possesses a light, mildly nut-like flavor and that the physical characteristics, such as size, density, flavor, color and texture, can be controlled to meet specific needs by variations in the process.

Wheat germ in its natural state contains approximately 7% to 10% by weight of oil. The wheat germ oil is highly unsaturated and as such it deteriorates rapidly in the presence of oxygen at ambient temperatures.

The raw material for the present invention comprises wheat germ, preferably from freshly milled wheat. Thus the wheat germ may be in the form of grits, flakes or ground flour prior to defatting. The wheat germ may be derived from any of the varieties of wheat, including hard wheat, soft wheat, durum, and the like. The wheat germ must be at least partially defatted (having residual oil of less than 5%), but preferably is fully defatted wherein the residual oil is not greater than 1%. The wheat germ may be defatted by either a solvent extraction of the freshly milled wheat germ, using the food grade solvent such as hexane, or by using a mechanical process to expel the oil from the wheat germ or by a combination of solvent and mechanical defatting. The particular process by which the wheat germ is defatted is not critical, but it is necessary to reduce the naturally occurring unsaturated oil content to less than 5% by weight in order to produce stable products with extended shelf life. Best shelf life is achieved with wheat germ containing less than 1% by weight of residual oil.

The defatted wheat germ, plus any auxillary or optional materials, is then extruded. The extrusion process can be viewed as two distinct steps, namely the conditioning step and the extrusion-cooking step.

In the conditioning step the moisture level of the defatted wheat germ is essentially adjusted to the desired level and the defatted wheat germ is preheated to the desired temperature range, at the preferred moisture level. The conditioner is, in general terms, a mechanism designed to impart intensive mixing of the defatted wheat germ and any ingredients, such as moisture or other optional ingredients, which are to be blended with the wheat germ. The conditioner can be of a tub configuration with rotary mixing powered from a central vertical spindle, or more commonly, a horizontal tubular conditioner, wherein the mixing takes place along the length of the tube caused by mixing paddles or bars which are affixed to a rotating shaft positioned horizontally through the central axis of the length of the tube.

The conditioning is preferably a continuous process, wherein the defatted wheat germ is fed to the conditioner from a supply hopper or bin located in the vicinity of the extruder-cooker machine. The conditioning chamber may be fed at a controlled rate either by means of a metering gate, a metering screw feeder, or other commonly used device controlling the flow of solids from a bulk supply source. Preferably the conditioner has provision for the addition of steam or water at points along its length in order to control temperatures and/or moisture. Normally steam is sparged into the wheat germ near its point of entry into the conditioner and sufficient quantity of steam is used to raise the wheat germ meal temperature from ambient to approximately 150° F. Additional water is added to adjust the final moisture to about 12% by weight at the point where the wheat germ exits from the conditioner and is fed into the cooker-extruder transport screw.

The addition of live steam to the wheat germ in the conditioner increases the temperature of the product as well as the moisture level. Residence time of the wheat germ in the conditioner is not critical in of itself, but it is necessary to hold the product in the conditioner long enough to permit the added water to be evenly distributed throughout all of the particles. This produces a free-flowing homogeneous (constant temperature, constant moisture) product to feed into the extruder. It has been found that a conditioner residence time of about 2 minutes is useful. It is essential to adjust the moisture content upwardly to about 12%, which provides a moist free-flowing product and preferably to raise the temperature to about 150° F.

As is pointed out elsewhere, supplemental materials such as flavoring ingredients, vitamins, oils, fats and other sources of vegetable protein may be included in the extruded wheat germ product of the present invention. It is generally considered desirable to add such supplemental materials prior to or during the conditioning process. This produces a homogeneous, conditioned wheat germ product which is fed to the cooker-extruder.

The overall function of the cooker-extruder is to knead and cook the free-flowing, conditioned, wheat germ under elevated temperature and elevated pressure conditions in order to convert it into a plastic dough. The conclusion of the kneading-cooking stage, the plastic dough is extruded into the atmosphere at which time the product is permitted to expand and cool.

The extrusion process can be carried out in many different types of conventional, commercially-available extruders. It is generally preferable to use a screw-type extruder wherein the apparatus imparts an increasing confinement on the wheat germ product as it progresses into the forward heating and cooking stage of the apparatus sections. Normally, the process transport screw is surrounded by a series of jacketed sections into which either heating and/or cooling media can be injected. In carrying out the extrusion step of the present invention, steam pressures of as much as 100 psi are imposed on some of the jackets surrounding the length of the extruder. As the meal proceeds into and through the cooking section, additional pressured water is metered into the process steam in order to adjust the total meal moisture to about 16%.

The moisture level of the wheat germ product at the cooker stage may be varied over a wide range from about 12% to about 25%, depending upon the type of product desired and, to some extent, upon the configuration of the extruder used. It has been found that defatted wheat germ having 15% to 17%, by weight, moisture generally produces a product with the most desirable expanded structure. If the moisture level is much below the 12-15% range, the process is adversely affected due to higher frictional forces and the possibility of the extruder becoming plugged with material, and the resulting product becomes less expanded and more crumbly. When the material has a moisture level above the 17-25% range, the expansion process is impaired due in part to less back pressure in the extruder and the product becomes too rubbery to be uniformly segmented. Higher moisture levels also necessitate longer drying time and result in a harder and tougher final product.

The residence time of the defatted wheat germ in the cooking section will vary depending upon the speed of the screw, the tooling used in the particular apparatus, and the configuration of the particular extruder being used. The preferred average residence time is approximately 1 minute in the extruder.

Many conventional extruders are designed to process a product to be extruded under gradually increasing pressure conditions. The screw flight, typically compresses the material to a greater extent as the material passes through the extruder. This type of apparatus is useful in carrying out the present invention. As was mentioned above, it is desirable to heat the product by applying pressured steam to the jackets along the initial length of the extruder. It is also sometimes desirable to add steam directly to the product in the cooking section. In addition to causing the product to be held under increasingly high pressures, the screw and internal tools of the extruder cause the wheat germ product to be worked, i.e., frictional shear pressure is brought thereon, which also raises the temperature of the product as it moves through the extruder.

It is difficult to measure the temperature and/or pressure of the product at any point within the extruder due to mechanical turbulence in the product and the jacketed nature of the barrel. However, thermocouples have been placed in wells near the internal surface of the extruder and such thermocouples indicate the final temperature of the product of the present invention may reach 350° F. or more, although the exact temperature of the product is not known. Because the product expands upon extrusion, it is contemplated that the product temperatures are significantly above 212° F. Similarly, it is difficult to measure the internal pressures in an extruder of this type, but extruders are fitted with pressure plugs which, by using a mechanical linkage, gives some indication of the pressures. Based on the use of such devices, it has been estimated that the pressure of the product within the extruder immediately ahead of the extruder head may reach 150 psi or more.

In many cases it will be desired to cool the product immediately prior to its extrusion. It has been found that if the product is too hot, upon extrusion, the moisture will flash and the resulting product will be shredded and fiber like, rather than the sought-after porous solid product. It has been found that through the introduction of cold water into the jackets surrounding the last 10-20% of the length of the extruder barrel, the temperature of the product may be reduced somewhat, whereby the product, upon extrusion, expands to form an open cell structure continuously extruded shape. A typical product extruded through a one-quarter inch diameter die preferably will have a diameter of about three-eighth inch.

In carrying out the process, the moistened, conditioned defatted wheat germ meal is fed into the extruder at atmospheric conditions wherein the worm type conveyer process screw and the internal tooling of the extruder intensively knead and convey the product. The frictional rotation of the worm and cut flighting of the transport screw raises the temperature of the conditioned wheat germ to produce a low moisture, elastic dough as it proceeds through the cooking section. The resulting low moisture, i.e., 15-17% moisture, elastic dough expands upon exiting through the extrusion die at atmospheric pressure. The expansion of the product is caused by entrapped internal water vapor pressure and air which produces a product having an open cell structure resembling a bubble-like void in continuously extruded shapes. By varying the shape of the discharge plate on the extruder die, various shapes can be produced. The design of the discharge plate can be modified to produce products having different cross-sectional shapes. The design of the discharge plate and the design of the resulting product is dictated to some extent by the amount of back-up pressure in the extruder section of the extruder.

The process can be controlled to produce a product which expands to a desired density. An example being an expansion of approximately 50% upon extrusion, that is that a product extruded through a one-quarter inch die would extrude to give a product three-eighth inch in diameter. The degree of expansion is directly related to the moisture content of the material passing through the extruder. When the moisture level falls too low, the product is difficult to extrude and sometimes the extruder will seize. When the moisture content is too high, the product will not expand adequately, and, upon drying, will be undesirably hard and brittle.

The extruded product flows from the die ports in a continuous ribbon, which may be dried directly, or more conveniently, the ribbon may be segmented into pieces about as long as the expanded ribbon diameter to produce a cube or small ball-like particle which facilitates handling in the dryer and subsequent conveying and sizing of the product. The expanded and extruded product can be dried in any conventional oven with either direct or indirect heating source. Drying temperatures in the area of 230° F. for about 15 minutes usually suffice to reduce the moisture level to the 3-4% range which promotes good stability. Immediate cooling of the product is desirable prior to its direct packaging or controlled sizing by crushing or grinding.

Those skilled in the art will understand that the product may be thereafter crushed or ground into any desired size. The density of the extruded product will vary somewhat based upon the size of the particles, and the processing conditions, but in any event, the extruded product will be less dense than conventional defatted wheat germ. For instance, it has been found that an extruded defatted wheat germ of the present invention which passes a 3 mesh screen but which is 99% retained on a 6 mesh screen weighs 18 pounds per cubic foot. A finer product, which will pass a 6 mesh screen, but which is 99% retained on a 30 mesh screen, weighs 22 pounds per cubic foot. Defatted wheat germ which has not been processed in accordance with the present invention weighs about 29.8 pounds per cubic foot. Further, the extruded product may be dried in its original form, and thereafter packaged for use without any additional crushing or grinding. In addition to using the crushed or ground product for various end uses, it may be further processed so as to be used as a cocoa replacer or extender.

The extrusion process also effects a change in the water absorption of defatted wheat germ. The water absorption is approximately doubled from a level of 2 times the product weight in the unextruded material to a level of 4 times the product weight in the extruded material. Absorption rates are subject to a certain degree to particle size and granulation.

The present invention is not limited to any express apparatus in which the process is carried out. The process of the present invention has been successfully carried out in Wenger Models X-20, X-25, and X-155. All of these machines are considered standard production extruders. They may be fitted with a wide variety of tooling to permit varying degrees of heating and cooking. These tooling variations control the residence time and the internal process pressures. An example of these tooling variations would be differences in configuration of the transport flighting, which determines the amount of frictional energy imposed on the product, and hence the amount of heat generated within the product being processed. While most of the experimental development work with respect to the present invention has been carried out on extruders manufactured by Wenger Manufacturing Co. of Sabetha, Kan., other equipment currently on the market, such as that produced by Bonnot could be adapted for use in the process described herein.

Good results have been obtained, for example, through the use of a Wenger X-20 extruder fitted with a live bin, a horizontal feeder and a double mixing cylinder. A die with a single $\frac{3}{8}$" diameter opening, a single 1 inch die spacer, and 4 knife blades were used. A feeder was set at 4.6 and ran at 21.0 RPM. The extruder was run at 400 RPM, with water run through Heads 1-8 and steam to the mixing cylinder. Water was fed to the mixing cylinder at 5.0 cc per second and to the extruder at 5.5 cc per second. Under these conditions, the extruder drew 29 Amps and showed a temperature of 130° F. at the mixing cylinder and also 130° F. at the 9th head.

The product of the present invention has a crisp and crunchy texture. When defatted wheat germ is the sole component of the product, it has a light and mildly nut-like flavor and a high nutritional value which is typical of wheat germ. This product has a low fat content and a low cost relative to other textured items which are traditionally used in snack foods, cookies, and confections, namely chocolates and nuts. It requires no additives and can be stored at room temperature in conventional paper packaging to provide an appealing low cost product. The product of the present invention typically shows a minimum protein content of 30%, a moisture content of about 2%, a fat content of no more than 1%, and a fiber content of about 5%.

The product of the present invention may incorporate, along with the defatted wheat germ, proteins from defatted oil-seeds such as peanut, cottonseed, soy, or sesame, fractions of other cereal grains, such as corn, oats or rice, milk proteins such as caseinates and non-fat dry skim milk products, vegetable fibers such as wheat bran, oat groats, and vegetable proteins such as wheat gluten. The present invention also contemplates the addition of auxillary stable fats to the defatted wheat germ prior to the extrusion step. Such fats may include hydrogenated oils or fats which may be added at levels as high as 15% or more. Any of the foregoing materials may be added to modify the functional and nutritional qualities of the finished product. For example, the addition of casein to the product will not only increase the nutritional value of the final product, but will change the density of the nuggets. Additions of 4% casein will effect an approximate reduction in density of 10% and 8% addition of casein will reduce the density about 20%. Additionally, colors, flavors, vitamins and minerals may be included in the product. Although all of these materials may be added to the product or mixed with the product after extrusion, it is preferred that such materials be added during the conditioning step described above.

The present invention also contemplates the coating of the extruded product with edible coatings, such as fats, sugar, corn syrup, dextrose, shellac, zein, beeswax, fructose and the like.

The forms of invention herein shown and described are to be considered only as illustrative. It will be apparent to those skilled in the art that numerous modifications may be made therein without departure from the spirit of the invention or the scope of the appended claims.

I claim:

1. A food product, the major portion of which comprises defatted, extruded wheat germ containing less than 5% by weight of oil, said product having an expanded open-cell structure, a crunchy and crisp texture and a palatable light, and mildly nut-like flavor (in its unflavored form), said product being stable in the presence of air at room temperature.

2. A food product as described in claim 1, wherein the oil content of the defatted, extruded wheat germ is no greater than 1% by weight.

3. A food product as described in claim 1, wherein the protein content is at least 20% by weight.

4. A food product as described in claim 1, wherein the product contains a minor amount of auxillary flavors.

5. A food product as described in claim 1, wherein the product contains a minor amount of auxillary vitamins.

6. A food product as described in claim 1, wherein the product contains a minor amount of auxillary oilseed protein.

7. A food product as described in claim 1, wherein the product contains a minor amount of added vegetable proteins.

8. A food product as described in claim 1, wherein the product contains a minor amount of auxillary vegetable proteins.

9. A food product as described in claim 1, wherein the product contains a minor amount of auxillary milk proteins.

10. A food product as described in claim 1, wherein the product contains a minor amount of auxillary edible flavors.

11. A food product as described in claim 1, wherein the product contains a minor amount of auxillary edible colors.

12. A food product as described in claim 1, wherein the product contains a minor amount of auxillary edible coatings.

13. A food product as described in claim 1, wherein the product contains up to 15% by weight of an auxillary saturated edible fat.

14. A method of preparing a food product which comprises:
   defatting wheat germ to an oil content of less than 5%,
   conditioning said defatted wheat germ to a water content of up to 12% and to a temperature of up to 150° F. to provide a free-flowing, conditioned wheat germ,
   increasing the water content of said conditioned wheat germ to from 12 to 25% by weight, subjecting said conditioned wheat germ having a controlled water content to mechanical working at increased pressures and temperatures for a time effective to cook said wheat germ,
   extruding said cooked germ into atmospheric pressure, permitting said wheat germ to expand, and
   drying said expanded extruded product to a water level no greater than about 8% by weight.

15. A method of preparing a food product as described in claim 14, wherein the moisture of the conditioned wheat germ is increased to from about 15 to about 17% by weight at the point of mechanical working at increased pressure and temperature.

16. A method of preparing a food product as described in claim 14, wherein the conditioned wheat germ is subjected to mechanical working at increased pressure and a temperature of about 350° F.

17. A method of preparing a food product as described in claim 14, wherein said defatted wheat germ has a fat content no greater than 1% by weight.

18. A method of preparing a food product as described in claim 14, wherein said extruded product is dried to a water level no greater than 4% by weight.

19. A method of preparing a food product which comprises the steps of:
   (1) providing a wheat germ having less than about 5% by weight of oil or fat, adding water to the meal to form a mixture having a water content of about 12–25% by weight;
   (2) mechanically working the mixture under conditions of elevated pressure and elevated temperatures for a time sufficient to convert said mixture to a flowable, plastic dough;
   (3) extruding said flowable plastic dough through a restricted orifice into an environment of ambient pressure causing the dough to expand and to form an expanded open cell structure; and
   (4) drying said extruded product to a water level of no more than about 12% by weight.

20. A method of preparing a food product as described in claim 19, wherein said elevated temperature is about 350° F.

21. A method of preparing a food product as described in claim 19, wherein said wheat germ contains no more than 1% by weight of oil or fat.

22. A method of preparing a food product as described in claim 19, wherein said product is dried to water level of no more than 4% by weight.

* * * * *

UNITED STATES PATENT OFFICE
CERTIFICATE OF CORRECTION

PATENT NO. : 4,256,769
DATED : March 17, 1981
INVENTOR(S) : Wayne K. Rice

It is certified that error appears in the above-identified patent and that said Letters Patent are hereby corrected as shown below:

Column 6, line 56 (Claim 7)
"proteins" should be --fibers--

Signed and Sealed this

Sixteenth Day of June 1981

[SEAL]

Attest:

RENE D. TEGTMEYER

Attesting Officer   Acting Commissioner of Patents and Trademarks